US012668506B2

(12) United States Patent
Williams et al.

(10) Patent No.: US 12,668,506 B2
(45) Date of Patent: Jun. 30, 2026

---

(54) RECYCLING AUTOMOTIVE PHOSPHATE RINSE WATER STREAM

(71) Applicant: ECOLAB USA Inc., St. Paul, MN (US)

(72) Inventors: Daniel M. Williams, Greenwood, IN (US); Tony Veljan Mackovski, Shelby Township, MI (US); Bruce Tait, Libertyville, IL (US); Joseph Peter Miknevich, Coraopolis, PA (US); Alex Michael Bogda, Clifton Park, NY (US); Aarthi Narayanan, Naperville, IL (US); William A. Von Drasek, Oak Forest, IL (US)

(73) Assignee: ECOLAB USA Inc., St. Paul, MN (US)

( * ) Notice: Subject to any disclaimer, the term of this patent is extended or adjusted under 35 U.S.C. 154(b) by 0 days.

(21) Appl. No.: 17/466,408

(22) Filed: Sep. 3, 2021

(65) Prior Publication Data

US 2021/0403343 A1      Dec. 30, 2021

Related U.S. Application Data

(62) Division of application No. 16/037,817, filed on Jul. 17, 2018, now Pat. No. 11,136,246.

(Continued)

(51) Int. Cl.
*C02F 1/00*          (2023.01)
*B01D 61/02*       (2006.01)
(Continued)

(52) U.S. Cl.
CPC ............ *C02F 1/008* (2013.01); *B01D 61/025* (2013.01); *B01D 61/04* (2013.01); *B01D 61/145* (2013.01);
(Continued)

(58) Field of Classification Search
CPC ..................................................... C02F 1/008
See application file for complete search history.

(56) References Cited

U.S. PATENT DOCUMENTS

| | | | |
|---|---|---|---|
| 3,956,118 A | 5/1976 | Kleber et al. | |
| 4,043,910 A | 8/1977 | Field et al. | |

(Continued)

FOREIGN PATENT DOCUMENTS

| | | |
|---|---|---|
| CN | 101607754 A | 12/2009 |
| DE | 4112391 A1 | 10/1992 |

(Continued)

OTHER PUBLICATIONS

Machine translation of KR-20160051953.*

(Continued)

*Primary Examiner* — Peter Keyworth
(74) *Attorney, Agent, or Firm* — Eric D. Babych; Barnes & Thornburg LLP

(57) ABSTRACT

The present disclosure relates to recycling automotive phosphate rinse water. An apparatus and method is disclosed for treating process water containing phosphate. The apparatus may include a process water line. The process water line may be in fluid communication with a sample process water line. The sample process water line may be in fluid communication with a dilution line. The sample process water line, the dilution line, and a phosphate analyzer may be in fluid communication with a diluted process water line. The apparatus may also include a chemical additive feed line in fluid communication with the process water line downstream from the sample process water line.

11 Claims, 6 Drawing Sheets

Related U.S. Application Data

(60) Provisional application No. 62/534,080, filed on Jul. 18, 2017.

(51) Int. Cl.

| | |
|---|---|
| *B01D 61/04* | (2006.01) |
| *B01D 61/14* | (2006.01) |
| *B01D 61/16* | (2006.01) |
| *C02F 1/44* | (2023.01) |
| *C02F 1/52* | (2023.01) |
| *C02F 1/56* | (2023.01) |
| *C23C 22/00* | (2006.01) |
| *C02F 101/10* | (2006.01) |
| *C02F 103/34* | (2006.01) |
| *C02F 103/44* | (2006.01) |

(52) U.S. Cl.

CPC .............. *B01D 61/16* (2013.01); *C02F 1/441* (2013.01); *C02F 1/444* (2013.01); *C02F 1/5209* (2013.01); *C02F 1/5236* (2013.01); *C02F 1/5245* (2013.01); *C02F 1/56* (2013.01); *C23C 22/00* (2013.01); *B01D 2311/04* (2013.01); *B01D 2311/12* (2013.01); *B01D 2311/2642* (2013.01); *C02F 2101/105* (2013.01); *C02F 2103/34* (2013.01); *C02F 2103/44* (2013.01); *C02F 2209/001* (2013.01); *C02F 2209/005* (2013.01); *C02F 2209/18* (2013.01); *C02F 2209/40* (2013.01); *C02F 2301/043* (2013.01); *C02F 2303/22* (2013.01)

(56) References Cited

U.S. PATENT DOCUMENTS

| | | | | |
|---|---|---|---|---|
| 5,240,681 | A | 8/1993 | Christina | |
| 5,747,342 | A | 5/1998 | Zupanovich | |
| 6,391,206 | B2 | 5/2002 | Chihara et al. | |
| 7,563,373 | B2 | 7/2009 | Bolduc | |
| 2002/0117430 | A1* | 8/2002 | Navarro | C02F 1/008 |
| | | | | 210/85 |
| 2006/0016751 | A1* | 1/2006 | Ali | B01D 61/04 |
| | | | | 210/651 |
| 2007/0000835 | A1* | 1/2007 | Gordon | B63B 35/44 |
| | | | | 210/603 |
| 2010/0243571 | A1 | 9/2010 | Semiat et al. | |
| 2013/0189708 | A1 | 7/2013 | Shiba et al. | |
| 2014/0262233 | A1* | 9/2014 | Keizer | E21B 47/10 |
| | | | | 166/250.01 |
| 2016/0221847 | A1 | 8/2016 | Kneib et al. | |
| 2016/0272519 | A1 | 9/2016 | Edwell et al. | |

FOREIGN PATENT DOCUMENTS

| | | | | | |
|---|---|---|---|---|---|
| EP | 3000788 | A1 | 3/2016 | | |
| JP | H0199608 | A | 4/1989 | | |
| JP | H 0817893 | B2 | 2/1996 | | |
| JP | H 09264507 | A | 10/1997 | | |
| JP | H11118680 | A | 4/1999 | | |
| JP | 2006281067 | A | 10/2006 | | |
| JP | 2007260556 | A | 10/2007 | | |
| KR | 20120001845 | A | 1/2012 | | |
| KR | 101269261 | B1 | 5/2013 | | |
| KR | 20160051953 | A * | 5/2016 | .............. | C02F 1/00 |
| WO | 2004050949 | A1 | 6/2001 | | |
| WO | 2015034845 | A1 | 3/2015 | | |
| WO | 2015169682 | A1 | 11/2015 | | |
| WO | 2015181206 | A1 | 12/2015 | | |
| WO | 2015181208 | A1 | 12/2015 | | |
| WO | 2016036390 | A1 | 3/2016 | | |

OTHER PUBLICATIONS

Citulski et al., "Optimization of phosphorus removal in secondary effluent using immersed ultrafiltration membranes with in-line coagulant pretreatment—implications for advanced water treatment and reuse applications," Canadian Journal of Civil Engineering (2009) 36(7), pp. 1272-1283.

ECOLAB, "OGM Plus. Oval Gear Meter with enhanced chemical resistance," Nov. 28, 2012, Retrieved from Internet: URL:https://www.ecolab-engineering.com/fileadmin/_migrated/content_uploads/OGMPlusSE11SheetF_B_Engl_04.pdf . Retrieved Sep. 25, 2018, 2 pages.

Gruwez et al., "Waste water minimization and water reuse in the automotive and textile industry," TREVI Environment Consultancy & Technology, Forum for Applied Biotechnology, Sep. 1999, 5 pages.

Gruwez et al., "Water Reuse and Waster Water Minimisation in the Automotive Industry: Reverse Osmosis in the Phosphating Process," TREVI Environmental Engineering & Technology, Sint-Denijslaan 317, B-9000 Gent, 6 pages.

Henderson et al., "Fluorescence as a potential monitoring tool for recycled water systems: A review," Water Research (2009) 43, pp. 863-881.

Ingildsen et al., Exploiting online in-situ ammonium, nitrate and phosphate sensors in full-scale wasterwater plant operation, Water Science and Technology (2002) 46(4), pp. 139-147. Dowloaded from https://waponline.com/wst/article-pdf/46/4-5/139/426210/139.pdf by Nalco Company user.

PCT International Search Report and Written Opinion for PCT/US2018/042477, mailed Oct. 4, 2018, 16 pages.

Citulski et al., "Optimization of ABMet Biological Selenium Removal through Advanced Process Modelling," Proceedings of the Water Environment Federation (2016) 11, pp. 949-961.

* cited by examiner

RECYCLING AUTOMOTIVE PHOSPHATE RINSE WATER STREAM

BACKGROUND

1. Field of the Invention

The present disclosure generally relates to recycling water. More particularly, the disclosure pertains to recycling automotive rinse water.

2. Description of the Related Art

Preparing car bodies for painting involves a series of pre-treatment stages. One of pre-treatment stages protects the car body from corrosion by treating the car body with anti-corrosion agents, such as zinc phosphate. The phosphating process improves adhesion of the paint primer to the metal in addition to serving as an anti-corrosion treatment.

Prior to the phosphating process, the car body may be washed with a cleaning agent to remove oils and dirt. The car body may then pass through several rinse stages before the activation and phosphate dip treatments. After the phosphate dip, the car body is rinsed and then treated with a passivation spray. Passivation can include other chemicals that enhance the anti-corrosion properties of the phosphate coating.

The rinsing stages require significant quantities of water to remove excess phosphate from the car body. Phosphate contaminated rinse water presents challenges for treatment and reuse, one of which is that the phosphate levels in the used rinse water can vary significantly. This variation can result in overdosing of expensive phosphate control agents.

BRIEF SUMMARY

In some embodiments, an apparatus for treating water containing phosphate is disclosed. The apparatus may include a process water line; a sample process water line in fluid communication with the process water line; a dilution line in fluid communication with the sample process water line; a diluted process water line in fluid communication with the sample process water line, dilution line, and a phosphate analyzer; and a chemical additive feed line in fluid communication with the process water line downstream from the sample process water line.

In some embodiments, the sample process water line and the dilution line each include an oval gear meter.

In some embodiments, the apparatus may include a bypass water line in fluid communication with the process water line.

In some embodiments, the apparatus may include an ultrafiltration unit in line with the process water line.

In some embodiments, the apparatus may include a reverse osmosis unit in line with the process water line.

In some embodiments, the process water line, the sample process water line, the dilution line, the diluted process water line, and the chemical additive feed line may each include a control valve.

In some embodiments, the apparatus may include a programmed logic controller in communication with the phosphate analyzer.

In some embodiments, the process water line may include a flow meter.

In some embodiments, the chemical additive feed line may include a flow meter and a chemical feed pump.

In other embodiments, a method of treating water is disclosed. The method may include diverting a portion of process water comprising phosphate; diluting the portion of the process water with dilution water to form diluted process water; passing to diluted process water into a phosphate analyzer; determining a phosphate concentration of the diluted process water; and determining a phosphate concentration of the process water using a ratio of a dilution water flow rate to a flow rate of the portion of the process water and the phosphate concentration of the diluted process water.

In some embodiments, the method may include calculating an amount of a phosphate control additive to add to the process water.

In some embodiments, the method may include injecting the phosphate control additive into the process water to form treated water.

In some embodiments, the phosphate control additive may be selected from ferric sulfate, ferric chloride, sodium aluminate, aluminum chlorohydrate, aluminum, aluminum chloride, polyaluminum chloride, cerium chloride, calcium-based coagulant, anionic polymer flocculant, and any combination thereof.

In some embodiments, the phosphate control additive may be selected from ferric sulfate, ferric chloride, and any combination thereof.

In some embodiments, the method may include passing the portion of the process water through a flow meter.

In some embodiments, the method may include passing the dilution water through a flow meter.

In some embodiments, the flow meter may be an oval gear meter.

In some embodiments, the method may include passing the treated water through a filtration system.

In some embodiments, the method may include passing the treated water through the filtration system when the phosphate concentration in the diluted process water is below about 50 ppm.

In certain embodiments, a method of treating process water used in an automotive phosphating process is disclosed. The method may include passing diluted process water into a phosphate analyzer, wherein the diluted process water may be a mixture of the process water and dilution water.

In some embodiments, the method may include determining a phosphate concentration of the diluted process water; determining a phosphate concentration of the process water using a ratio of a dilution water flow rate to a flow rate of the process water that passed through an oval gear meter and the phosphate concentration of the diluted process water; and calculating an amount of a phosphate control additive to add to the process water.

In some embodiments, the method may include injecting the phosphate control additive into the process water to form treated water; and passing the treated water through a filtration system.

In some embodiments, use of an apparatus in a method of treating water is disclosed. The apparatus may include a process water line; a sample process water line in fluid communication with the process water line; a dilution line in fluid communication with the sample process water line; a diluted process water line in fluid communication with the sample process water line, dilution line, and a phosphate analyzer; and a chemical additive feed line in fluid communication with the process water line downstream from the sample process water line.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

A detailed description of the invention is hereafter described with specific reference being made to the drawings in which.

DETAILED DESCRIPTION

Figure 1:
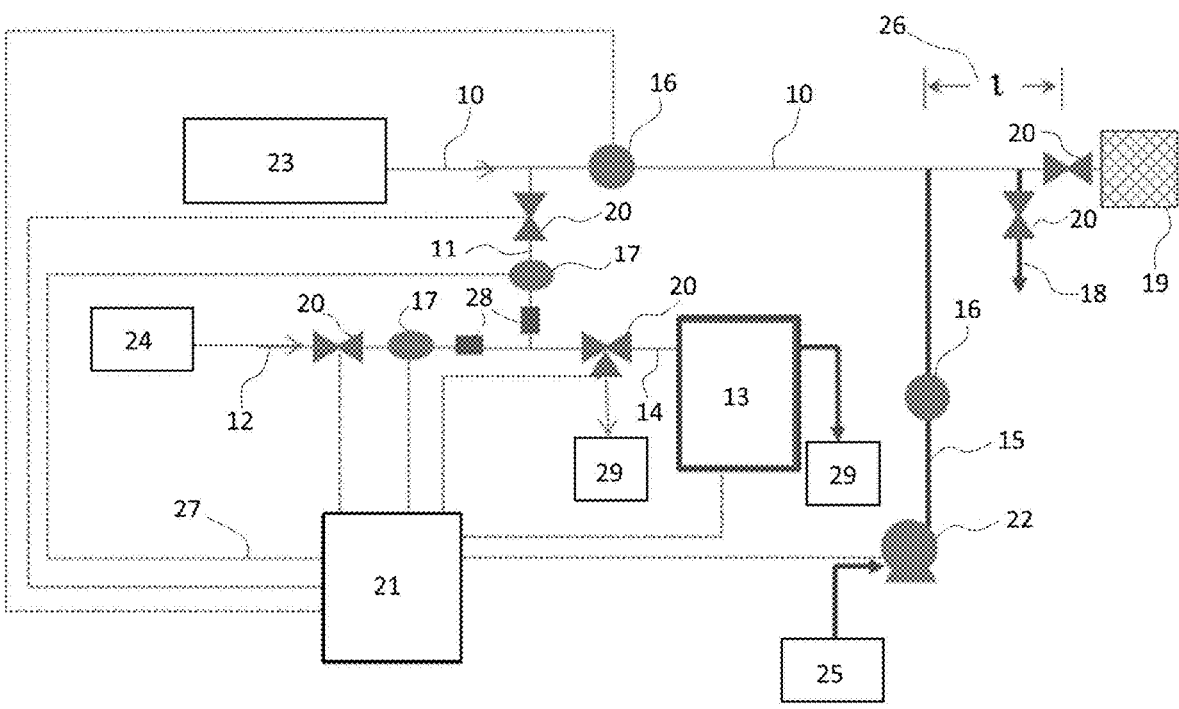
FIG. 1 shows a schematic of an embodiment of an apparatus for treating water containing phosphate.

Various embodiments are described below. The relationship and functioning of the various elements of the embodiments may better be understood by reference to the following detailed description. However, embodiments are not limited to those illustrated below. In certain instances details may have been omitted that are not necessary for an understanding of embodiments disclosed herein.

To optimize the chemical dosage for phosphate control before treatment requires measuring the phosphate level in the process water. These levels can vary on a rinse stage depending on the operating conditions, e.g., production rate (automotive throughput) and dilution (counter flow). Additionally, the phosphate levels can reach levels greater than about 300 ppm. Commercial online phosphate monitoring systems, such as HACH Phosphax™, are limited to about 50 ppm with sampling times of about 5-10 minutes. The HACH Phosphax cannot accurately determine the phosphate concentration in water containing greater than about 50 ppm.

Phosphate in the water can lead to fouling of reverse osmosis membranes. Reusing the overflow water from an automotive phosphating process by treatment with a reverse osmosis system requires control of the phosphate concentration to avoid membrane fouling.

To address this drawback, one approach is to isolate the process flow line from the conditioning section, inject treatment chemical, and use the online monitor to adjust the treatment chemical to achieve a targeted phosphate level. The phosphate analyzer samples the water that is already treated with the chemical. Operating in this condition requires initially overdosing the treatment chemical followed by gradually optimizing the dosage based on the process and chemical feed flow rates. Besides using unnecessary amounts of treatment chemical, the treated water may not be fed to the filtration system until the dosage is optimized leading additional and unnecessary water waste.

The apparatus embodiments and method embodiments disclosed herein address the aforementioned drawbacks resulting in a system that reduces water usage and eliminates waste of treatment chemicals.

In some embodiments, an apparatus is disclosed for treating process water containing phosphate. The apparatus may include a process water line. The process water line may be in fluid communication with a sample process water line. The sample process water line may be in fluid communication with a dilution line. The sample process water line, the dilution line, and a phosphate analyzer may be in fluid communication with a diluted process water line. The apparatus may also include a chemical additive feed line in fluid communication with the process water line downstream from the sample process water line.

It is envisioned that the apparatus can be installed in any process system where the treatment of phosphate contaminated water is desired. The apparatus may be particularly useful in systems for treating automotive rinse water; however, the apparatus is not necessarily limited to treating rinse overflow water used in automotive processes.

In some embodiments, the sample process water line and the dilution line may each include flow meter. In some embodiments, the sample process water line and the dilution line may each include an oval gear meter. Oval gear meters measure discrete amounts of liquid where accurate volume dispensing may be desired.

In some embodiments, the apparatus may include a bypass water line in fluid communication with the process water line. In some embodiments, the bypass water line may be connected with the process water line at any point after the sample process water line.

In some embodiments, the apparatus may include a filtration system in line with the process water line. In some embodiments, the filtration system may be an ultrafiltration unit. The ultrafiltration unit may include a filtration membrane with a pore size ranging from about 0.01 microns to about 0.5 microns. In some embodiments, the filtration membrane may have a pore size ranging from about 0.02 microns to about 0.1 microns. In some embodiments, the filtration membrane may have a pore size ranging of about 0.02 microns. In some embodiments, the filtration membrane may have a pore size ranging of about 0.05 microns. In some embodiments, the filtration membrane may have a pore size ranging of about 0.1 microns.

In some embodiments, the filtration system may be a reverse osmosis unit. In some embodiments, the filtration system may include an ultrafiltration unit and a reverse osmosis unit in series.

In some embodiments, the process water line, the sample process water line, the dilution line, the diluted process water line, and the chemical additive feed line may each independently include a control valve. In some embodiments, the sample process water line and the dilution line may include a check valve.

In some embodiments, the apparatus may include a programmed logic controller in communication with the phosphate analyzer. The phosphate analyzer may be but is not limited to a HACH Phosphax™ analyzer.

In some embodiments, the process water line may include a flow meter. In some embodiments, the chemical additive feed line may include a flow meter and a chemical feed pump.

Figure 2:
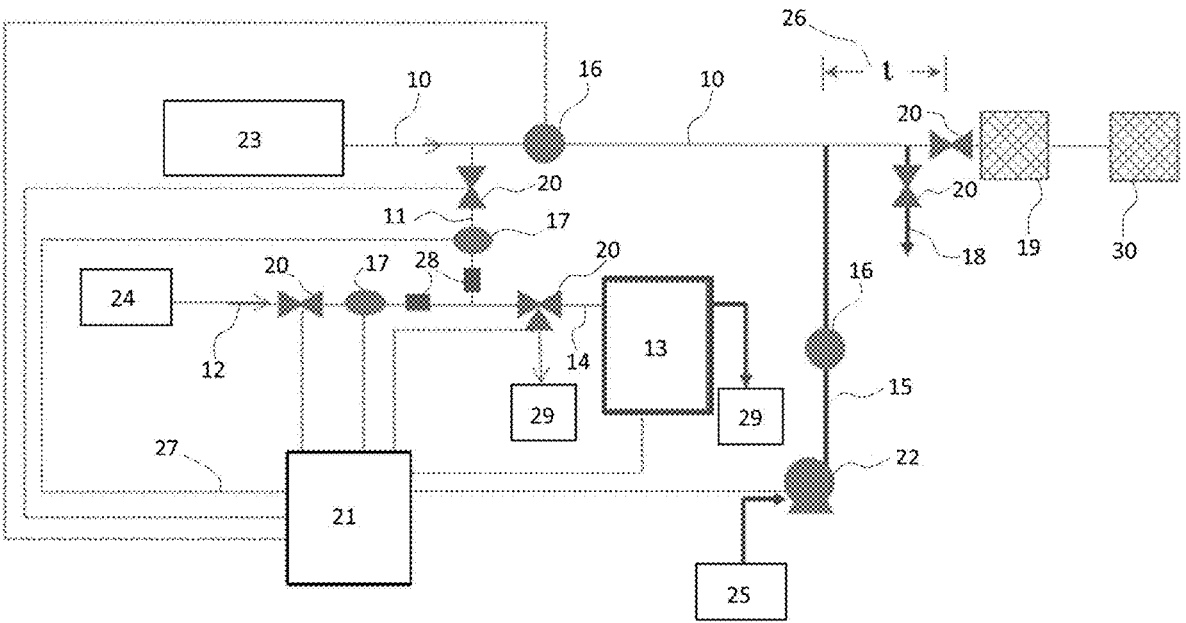
FIG. 2 shows a schematic of an embodiment of an apparatus that includes a reverse osmosis unit for treating water containing phosphate.

FIG. 1 and FIG. 2 show embodiments of the apparatus. The process water line 10 may be in fluid communication with a sample process water line 11. The sample process water line 11 may be in fluid communication with a dilution line 12. The sample process water line 11, the dilution line 12, and a phosphate analyzer 13 may be in fluid communication with a diluted process water line 14. The apparatus may also include a chemical additive feed line 15 in fluid communication with the process water line 10 and downstream from the sample process water line 11. The process water line 10 and the chemical additive feed line 15 may comprise a flow meter 16. The sample process line 11 and the dilution line 12 may both comprise flow meters 17 and the flow meters 17 may be oval gear meters. FIGS. 1 and 2 also show that the apparatus may include a bypass water line 18. The apparatus may also include an ultrafiltration system 19. Control valves 20 may be used to control the flow of process water. A controller 21, such as a programmed logic controller, may be connected to the control valves 20, flow meters 16 and 17, phosphate analyzer 13, and chemical feed pump 22 via any suitable electrical connection 27. Process water may be fed into the process water line 10 from a phosphatizing process 23. Dilution water may be fed into the dilution line 12 from any suitable water source 24. The chemical feed pump 22 may pump chemicals from a chemical additive holding tank 25 into the process water line 10. The location of injection into the process water line 10 should be at a certain distance 26 from the ultrafiltration system 19. In addition, the sample process water line 11 and the dilution line 12 may both comprise check valves 28. Waste water may be directed to effluent holding tanks 29 for further treatment or disposal. FIG. 2 shows an embodiment where a reverse osmosis unit 30 may be in series with the ultrafiltration system 19.

In some embodiments, a method of treating water is disclosed. The method may include diverting a portion of process water comprising phosphate and diluting the portion of the process water with dilution water to form diluted process water. The method may include passing the diluted process water into a phosphate analyzer to determine the phosphate concentration. The phosphate concentration in the process water can be determined using a ratio of the dilution water flow rate to a flow rate of the portion of the process water or diverted process water and the phosphate concentration of the diluted process water.

In some embodiments, the method may include calculating an amount of a phosphate control additive to add to the process water. Based on the phosphate levels in the process water, a predetermined proportion of the phosphate control additive can be added to the process water to remove phosphate. In some embodiments, the method may include injecting the phosphate control additive into the process water to form treated water.

The phosphate control additive can be, but is not limited to, ferric sulfate, ferric chloride, sodium aluminate, aluminum chlorohydrate, aluminum, aluminum chloride, polyaluminum chloride, cerium chloride, calcium-based coagulant, anionic polymer flocculant, or any combination thereof. In some embodiments, the phosphate control additive may be a salt of iron(III). In some embodiments, the phosphate control additive may be ferric chloride. In some embodiments, the phosphate control additive may be ferric sulfate. In some embodiments, the phosphate control additive may be sodium aluminate. In some embodiments, the phosphate control additive may be polyaluminum chloride. In some embodiments, the phosphate control additive may be aluminum chlorohydrate. In some embodiments, the phosphate control additive may be cerium chloride.

In some embodiments, the method may include passing the treated water through a filtration system. The filtration system may be an ultrafiltration unit as described above or a reverse osmosis system, for example.

In some embodiments, the treated water is passed through the filtration system when the phosphate concentration in the diluted process water is below about 50 ppm. In some embodiments, the phosphate concentration in the diluted process water may be below about 40 ppm, about 30 ppm, or about 20 ppm when the treated water is passed through the filtration system.

In some embodiments, the process water may bypass the filtration system until the phosphate concentration in the diluted process water reaches the detection limit of the phosphate analyzer. In some embodiments, the method may include diverting the process water before reaching the filtration system until the phosphate concentration in the diluted process water reaches a predetermined phosphate concentration. The predetermined phosphate concentration may be the highest level of phosphate that the phosphate analyzer can reliably detect. The predetermined phosphate concentration may be about 50 ppm.

In some embodiments, the method may include passing the portion of the process water through a flow meter. The process water that is diverted from the main process line may be diluted then analyzed in the phosphate analyzer to determine the phosphate concentration. The flow rate of the diverted process water may be determined using any of the flow meters described in the present application. In some embodiments, the flow meter may be an oval gear meter.

In some embodiments, the method may include passing the dilution water through a flow meter. The means for determining the flow rate of the dilution water may be as described in the present application. In some embodiments, the flow rate of the dilution water may be determined using an oval gear meter. The dilution water may be mixed with the portion of the process water or that process water that is diverted for sampling.

In some embodiments, a method of treating process water used in an automotive phosphating process may include passing the process water through an oval gear meter and passing dilution water through an oval gear meter. The method may include diluting the process water with the dilution water to form a diluted process water. The diluted process water may then be fed into a phosphate analyzer to determine the phosphate concentration of the diluted process water. The phosphate concentration in the process water can be determined using the ratio of the dilution water flow rate to the flow rate of the process water that passed through the oval gear meter and the phosphate concentration of the diluted process water. Once the phosphate concentration in the process water has been determined the amount of phosphate control additive to inject into the process water can be calculated. The phosphate control additive may be injected into the process water to form treated water. After injecting the phosphate control additive into the process water, the treated water may be passed through a filtration system.

In some embodiments, the method may include injecting the phosphate control additive at a position in the process water line that will allow for sufficient mixing before the treated water enters the filtration system. The injection location on the process water line can be determined by one of skill in the art. Factors that may influence the distance between the injection position and the filtration system may be flow rate, pipe size, injection means, and phosphate control additive.

The phosphate control additive may be injected into the process water using a quill or Pareto™ device. One of skill in the art will appreciate that any injection means may be used that allows the phosphate control additive to mix efficiently with the process water.

The method steps may be controlled from a central controller using the signals from the flow meters, control valve state, chemical feed pump, and PO$_4$ analyzer. Implementation of this control strategy addresses the risk associated with potential RO membrane fouling.

EXAMPLES

Example 1

Several different phosphate control additives were tested; the different chemistries and their trade names/identification are listed below in Table 1.

TABLE 1

Chemistries tested and their identification.

| Phosphate Control Additive Identification | Chemistry |
|---|---|
| Additive 1 | Ferric sulfate |
| Additive 2 | Aluminum chlorohydrate |
| Additive 3 | Cerium chloride |
| Additive 4 | High molecular weight anionic inverse emulsion flocculant |
| Additive 5 | 38 wt % solution of sodium aluminate |
| Additive 6 | Zirconium modified polyaluminum chloride |

8

TABLE 1-continued

Chemistries tested and their identification.

| Phosphate Control Additive Identification | Chemistry |
|---|---|
| Additive 7 | Polyaluminum chloride |
| Additive 8 | Aluminum chloride (AlCl$_3$) |

Figure 3:
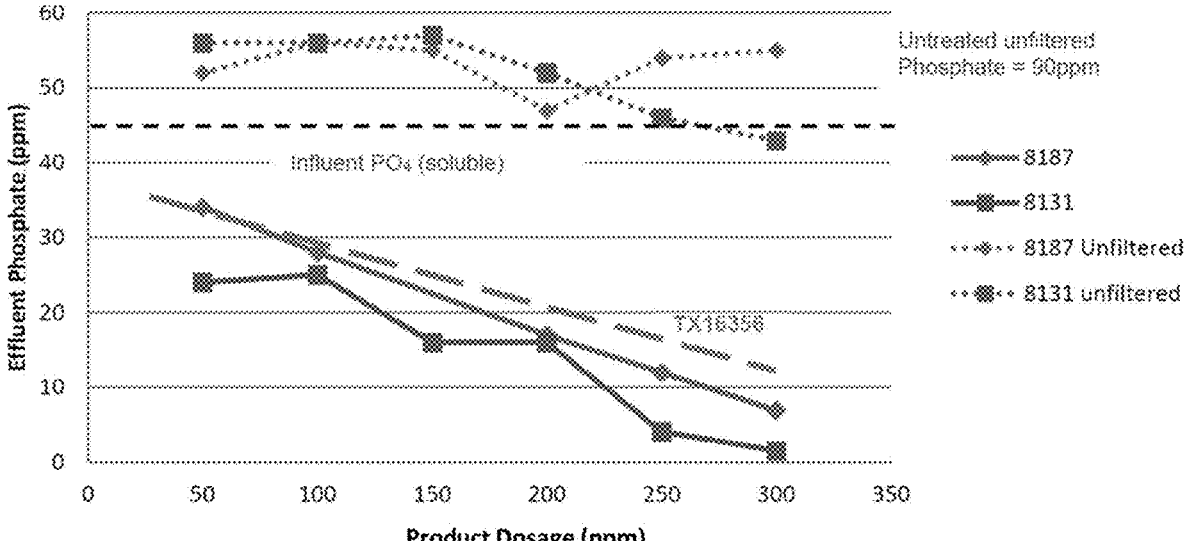
FIG. 3 shows the effluent phosphate level in treated water as a function of increasing dosages of different phosphate control additives.

FIG. 3 shows a blended phosphate water stream treated with and increasing dosage of Additive 1 or Additive 2, and the resulting effluent phosphate concentrations. Total phosphate in the phosphate water stream before treatment was about 90 ppm. The product dosage as ppm neat product is labeled on the horizontal axis, and effluent phosphate (PO$_4$) in ppm is on the vertical axis. The data represented by squares represent water treated with Additive 1, while the diamonds represent water treated with Additive 2. Both chemistries were tested and effluent was measured before filtering (dotted line) and after filtering (solid line) with a 0.45 micron filter. A measurement of the untreated but filtered water was also performed indicated by the black dashed line (~45 ppm). Lastly, the dashed line labeled Additive 3 shows that chemistry's overall trend in performance in reducing phosphate concentration.

Initial COI results from testing Additive 1 and Additive 2 indicate that three major findings: 1) Low level phosphate results can be achieved with chemistry and equipment combination; 2) Additive 1 appears to be more effective at removing phosphate than Additive 2; and 3) Filtering the samples greatly reduced the effluent phosphate readings. Filtering the untreated sample removed more phosphate than using a chemistry listed in Table 1 without filtering. Other tests were completed to evaluate mixing time, which showed no significant change in effluent phosphate levels between about 5 and about 15 minutes.

Example 2

Table 2 shows 11 chemistry tests completed on phosphate recycle water, and the corresponding effluent phosphate results. The top row of the table is labeled for what each column filled in below represents. The pH of the water was tested before and after adding the chemistry at the dosage indicated in the Table below. Three phosphate measurements taken on the effluent which include: total, organic and inorganic phosphate. All values besides pH are in parts per million. Three different chemistries and combinations were tested including products Additive 2, Additive 3, and FeCl$_3$.

TABLE 2

Chemistry effect on phosphate levels.

| Sample | pH | Chemistry 1 | Dosage (ppm) | Chemistry 2 | Dosage (ppm) | pHf | Total PO$_4$ (ppm) | Org PO$_4$ (ppm) | InOrg PO$_4$ (ppm) |
|---|---|---|---|---|---|---|---|---|---|
| Base | | | | | | | 49 | <49 | 49 |
| 1 | 11.5 | N/A | N/A | N/A | N/A | 11.5 | 1.8 | <1.8 | 0 |
| 2 | 8.21 | Additive 2 | 250 | N/A | N/A | 8.0 | 11 | <11 | 0 |
| 3 | 8.3 | Additive 2 | 350 | N/A | N/A | 7.8 | 11 | 1 | 10 |
| 4 | N/A | Additive 3 | 400 | N/A | N/A | 7.3 | 2.7 | 0.1 | 2.6 |
| 5 | N/A | Additive 3 | 500 | N/A | N/A | 7.3 | 1.6 | 0.1 | 1.5 |
| 6 | N/A | Additive 3 | 700 | N/A | N/A | 7.3 | <1.0 | <1.0 | <1.0 |
| 7 | N/A | FeCl$_3$ | 125 | N/A | N/A | 6.75 | 32 | <32 | 32 |
| 8 | N/A | FeCl$_3$ | 200 | N/A | N/A | 6.75 | 27 | 3 | 24 |
| 9 | N/A | FeCl$_3$ | 150 | Additive 3 | 300 | 6.6 | <1.0 | <1.0 | <1.0 |
| 10 | 8.6 | Additive 2 | 250 | Additive 3 | 300 | 7.93 | 1.4 | 1.3 | <0.2 |
| 11 | 8.23 | Additive 2 | 150 | Additive 3 | 300 | 7.88 | <1.0 | <1.3 | <1.0 |

Example 3

Figure 4:
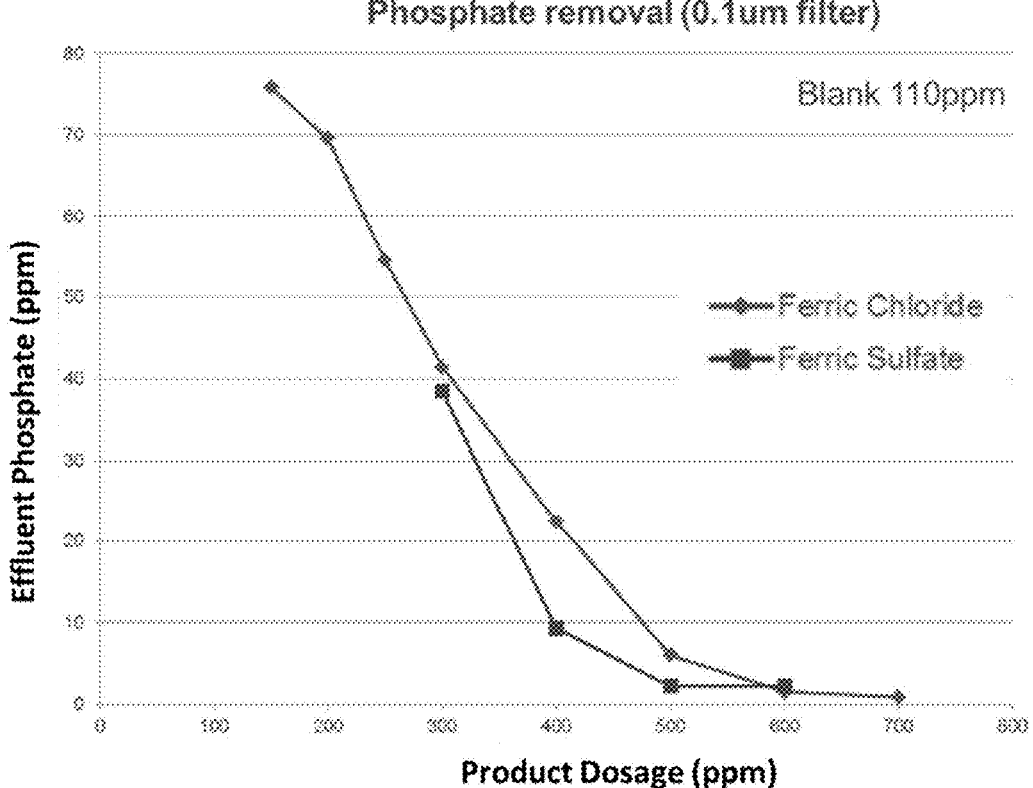
FIG. 4 shows the effluent phosphate level in treated water as a function of increasing dosages of ferric chloride and ferric sulfate after filtering with a membrane with 0.1 μm pore size.

Ferric chloride (about 40 wt % the balance being water) and ferric sulfate (Additive 1) were compared to each other on a phosphate stream mix, with a starting phosphate level of about 110 ppm. FIG. 4 shows a dosage curve for ferric chloride and ferric sulfate on a blended phosphate stream with resulting effluent phosphate measurements after filtering with a 0.1 μm filter. The horizontal axis shows product dosage in ppm, and the vertical axis shows effluent phosphate (total) in ppm. The untreated sample measured at 110 ppm phosphate.

Ferric chloride and ferric sulfate had similar results, both showing they could reduce phosphate down to single digits after filtering. Ferric sulfate had a slight performance advantage under about 600 ppm. Other chemistries of interest were tested in the same manner as above including Additive 3, Additive 8, Additive 7, Additive 5 and a supplier product (Additive 6). Their optimum dosage and resulting phosphate measurement are shown in Table 3 below. These results show that Additive 7 and Additive 5, ferric chloride, and ferric sulfate are the most effective products in removing phosphate. All products were tested at pH between about 6.5 and about 7.

Table 3 shows seven chemistry tests completed on phosphate recycle water and the corresponding effluent phosphate results. The phosphate concentration was measured after filtering with a 0.1 μm filter.

TABLE 3

Effluent phosphate concentration using different chemistries.

| Chemistry | Dosage (ppm) | Results (ppm Phosphate) |
|---|---|---|
| Additive 3 | 400 | 8.9 |
| $AlCl_3$ | 600 | 5.5 |
| Additive 7 | 600 | 0.7 |
| Additive 6 | 500; 600 | 22.3; 0.4 |
| Additive 5 | 700 | 0 |
| Ferric chloride (40%) | 600 | 1.5 |
| Additive 1 | 600 | 2.2 |

Figure 5:
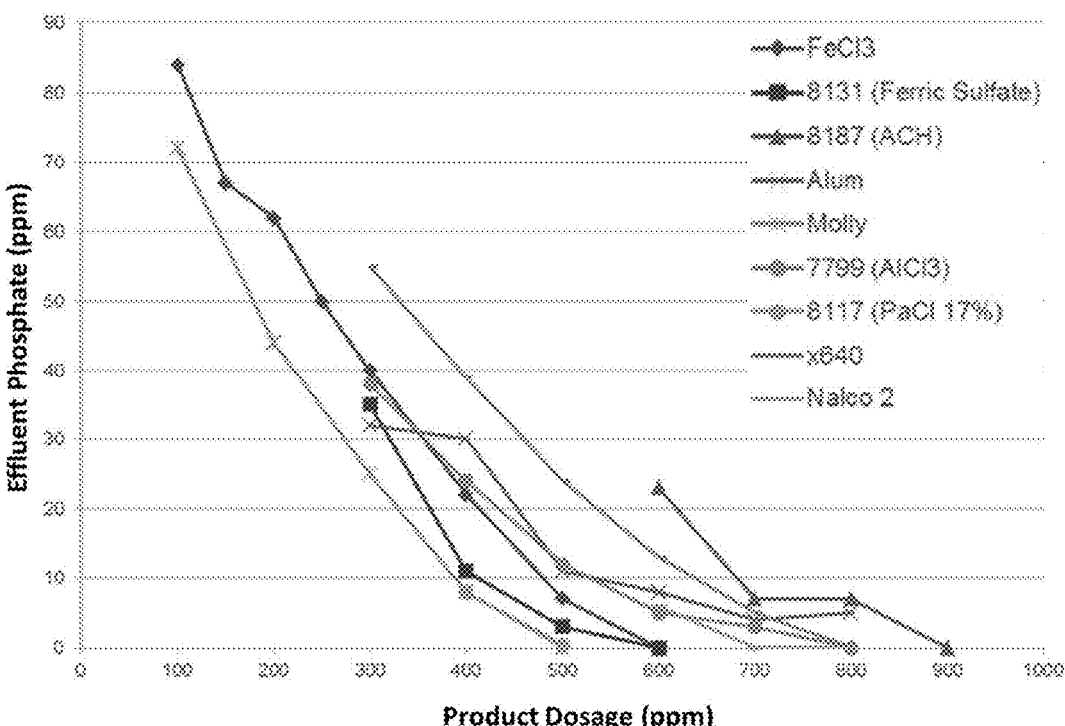
FIG. 5 shows the effluent phosphate level in treated water as a function of increasing dosages of different phosphate control additives.

FIG. 5 shows the full dosage curves for the chemistries tested above. Additive 3, Additive 7, ferric sulfate and ferric chloride (40%) demonstrated superior phosphate removal based on performance. Single digit phosphate numbers were achieved at around about 500 to about 600 ppm. All tests were completed at pH about 6.5-7. The phosphate concentration was measured after filtering with a 0.1 μm filter. The horizontal axis shows product dosage in ppm, and the vertical shows effluent phosphate (total) in ppm. The untreated sample measured at about 110 ppm phosphate.

Example 4

Figure 6:
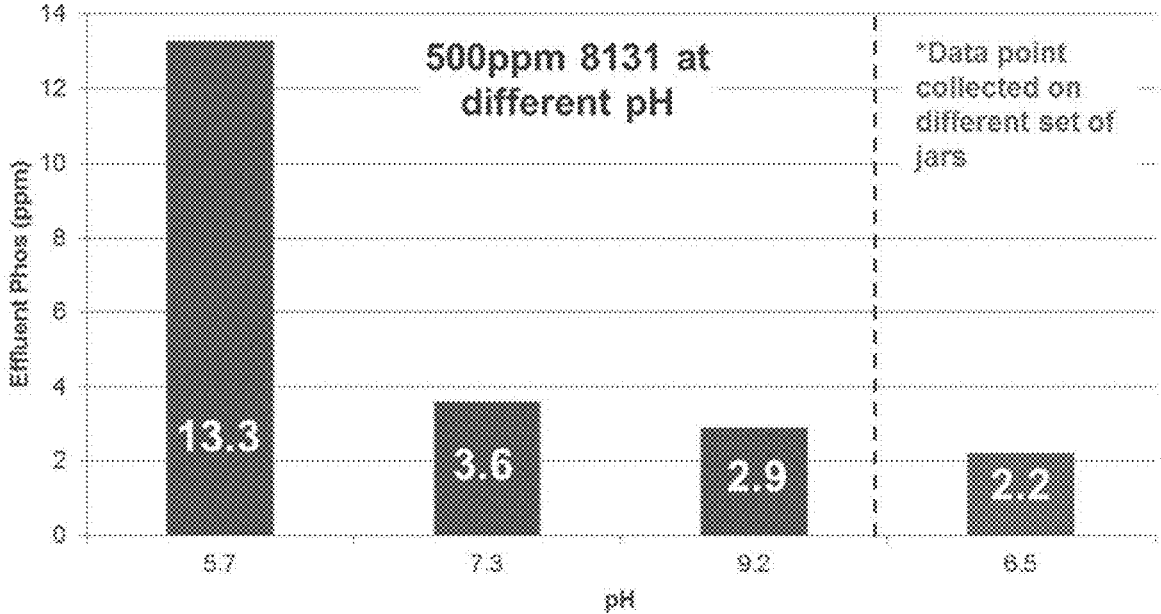
FIG. 6 shows the effect of pH on the effluent phosphate levels of water treated with ferric sulfate.

To see the effect of pH on the sample, about 500 ppm of Additive 1 was tested on the phosphate stream at pH about 5.7, about 6.2, about 7.3 and about 9.2. This pH adjustment was done after the product was dosed into the sample; thereby, allowing the sample to react at the certain pH. Effluent phosphate showed similar results for all pH values at and above a pH of about 6.2. Phosphate removal was unaffected by pH at or above a pH of about 6.5. FIG. 6 shows phosphate measurements after the phosphate water stream was treated with about 500 ppm of Additive 1. The horizontal axis shows sample pH, and the vertical axis shows effluent phosphate in ppm. Each test was adjusted to a different pH after Additive 1 addition to see the effect of pH on phosphate removal. The phosphate concentration was measured after filtering with a 0.1 μm filter. One data point, at pH of about 6.5, was collected at a different time than the other samples, but was tested on the same water.

Example 5

Field and pilot trials were conducted to test feasibility on a larger scale. Additive 7 and Additive 1 were chosen for the pilot study based on cost and phosphate removal performance. The reaction and filtering steps were scaled up. Filtering was performed using an ultrafiltration membrane with a pore size of about 0.05 or about 0.02 μm. Results showed that about 800 ppm of Additive 7 or about 650 ppm of Additive 1 were able to achieve an effluent phosphate level of about 3 ppm or less. Results are shown below in Table 4.

TABLE 4

Pilot study using Additive 7 or Additive 1 and ultrafiltration.

| Chemistry and Dose | Initial pH before Chemistry addition | Filter Pore Size (μm) | Hach $PO_4$ Measurement (ppm) | CA ICP Phosphorus (Theoretical $PO_4$) (ppm) | CA Total $PO_4$ (ppm) |
|---|---|---|---|---|---|
| Additive 7; 800 ppm | 8 | 0.02 | 0.9 | 0.51 (1.6) | <5 |
|  | 8 | 0.05 | 1 | 0.57 (1.9) | <5 |
| Additive 1; 650 ppm | 7.5 | 0.02 | 1.3 | 0.83 (2.7) | <5 |
|  | Unknown | 0.05 | 1.5 | 0.81 (2.6) | <5 |
| No Treatment | — | — | — | 39 (125) | 110 |

The labeled columns describe the chemistry tested, the pH adjustment before chemical addition, the filter size used, the HACH phosphate analyzer reading onsite, the inductively coupled plasma (ICP) result for effluent phosphorous, and the total phosphate in the sample.

Additionally, the pH within the working tanks was adjusted after addition of the chemicals. Mixing for coagulation was provided by a centrifugal pump that recirculated the rinse water in the working tanks until a stable floc was observed. Phosphate concentrations were measured onsite by Nalco using HACH analytical test kits and a portable spectrophotometer. A single 6' long×0.5" diameter polyvinylidene fluoride tubular membrane module was used for solids separation. Membranes pore sizes of about 0.02 and about 0.05 microns were tested, each module contained a membrane surface area of about 0.75 ft$^2$.

The chemically precipitated rinse water in the working tank was pumped through the membrane modules at a crossflow velocity of approximately 3.5 meters/second and the retentate was recirculated back to the respective working tank. The permeate was directed to sample containers so that it could be tested both onsite for phosphorus and offsite using ICP.

It was determined that both membranes (with the 0.02 and 0.05 micron pore sizes) were adequate for phosphorus and solids removal to provide a suitable permeate for reverse osmosis feed water. Additionally Nalco solutions Additive 7 and Additive 1 were also suitable to achieve the treatment goals.

Example 6

Table 5 shows the theoretical removal rate vs the experimental removal rate for 1 ppm of product to remove 1 ppm of phosphate. For the experimental rate, data points were averaged from the lowest dosage, cut off at the dosage able to achieve less than about 2 ppm phosphate.

TABLE 5

Theoretical removal rate compared to experimental results

| Product | Theoretical Removal Rate | Average Experimental Result |
|---|---|---|
| FeCl$_3$ (40 wt %) | 4.3 | 4.7 |
| Ferric sulfate (50 wt %) | 3.4 | 4.2 |
| Aluminum chlorohydrate (50 wt %) | 6.6 | 7.2 |
| Aluminum chloride (40 wt %) | 4.6 | 5.2 |
| Aluminum (dry) | 3.3 | 5.7 |
| Polyaluminum chloride | — | 4.2 |

In the drawings, 8117 refers to polyaluminum chloride, TX16356 is a defoamer, 8187 refers to Additive 2, 8131 refers to Additive 1, molly refers to Additive 3, Alum refers to aluminum sulfate, x640 refers to Additive 6, and Nalco 2 refers to sodium aluminate.

As used herein, the term "about" refers to the cited value being within the errors arising from the standard deviation found in their respective testing measurements, and if those errors cannot be determined, then "about" refers to within 10% of the cited value.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. An apparatus for treating water containing phosphate, comprising:
   a process water line and an ultrafiltration unit in series with the process water line;
   a sample process water line connected to the process water line by a first control valve in fluid communication with the process water line;
   a dilution line including a second control valve in fluid communication with the sample process water line, wherein the sample process water line and the dilution line each comprise a flow meter;
   a diluted process water line in fluid communication with the sample process water line, dilution line, and a phosphate analyzer located downstream of the diluted process water line;
   a chemical additive feed line connected to the process water line downstream from the sample process water line to inject a phosphate control additive into the process water line; and
   an effluent holding tank downstream of the phosphate analyzer, wherein waste water from the phosphate analyzer is directed to the effluent holding tank;
   wherein process water in the process water line passes through the ultrafiltration unit after the sample process water line, and wherein the chemical additive line is connected to the process water line upstream of the ultrafiltration unit.

2. The apparatus of claim 1, wherein each of the flow meter of the sample process water line and the flow meter of the dilution line is an oval gear meter.

3. The apparatus of claim 1, further comprising a bypass water line in fluid communication with the process water line.

4. The apparatus of claim 1, wherein the diluted process water line comprises a third control valve.

5. The apparatus of claim 1, further comprising a programmed logic controller in communication with the phosphate analyzer.

6. The apparatus of claim 5, wherein the programmed logic controller is in communication with the flow meter of the sample process water line, and the flow meter of the dilution line.

7. The apparatus of claim 1, wherein the process water line comprises a flow meter.

8. The apparatus of claim 1, wherein the chemical additive feed line comprises a flow meter and a chemical feed pump.

9. The apparatus of claim 1, further comprising a reverse osmosis unit in series with the ultrafiltration unit.

10. The apparatus of claim 1, wherein the ultrafiltration unit includes a filtration membrane with a pore size ranging from about 0.01 microns to about 0.5 microns.

11. The apparatus of claim 1, wherein the phosphate analyzer is configured to determine a phosphate concentration of fluid in the diluted process water line.

* * * * *